US008904391B2

(12) United States Patent
Benantar et al.

(10) Patent No.: US 8,904,391 B2
(45) Date of Patent: Dec. 2, 2014

(54) POLICY-BASED ACCESS CONTROL APPROACH TO STAFF ACTIVITIES OF A BUSINESS PROCESS

(75) Inventors: Messaoud B. Benantar, Austin, TX (US); Hari Haranath Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1981 days.

(21) Appl. No.: 11/738,794

(22) Filed: Apr. 23, 2007

(65) Prior Publication Data

US 2008/0263060 A1   Oct. 23, 2008

(51) Int. Cl.
G06Q 10/00 (2012.01)
G06F 17/30 (2006.01)
G06F 9/50 (2006.01)
G06F 9/44 (2006.01)
G06Q 10/06 (2012.01)

(52) U.S. Cl.
CPC .......... *G06Q 10/06* (2013.01); *G06F 17/30734* (2013.01); *G06F 9/5055* (2013.01); *G06F 9/4433* (2013.01)
USPC .......................................... 718/100; 705/7.11

(58) Field of Classification Search
CPC ............ G06F 17/30477; G06F 9/5055; G06F 17/30421
See application file for complete search history.

(56) References Cited

U.S. PATENT DOCUMENTS 5,369,702 A * 11/1994 Shanton ........................ 713/166
5,764,958 A *  6/1998 Coskun ........................ 719/315
5,911,143 A *  6/1999 Deinhart et al. ...................... 1/1
5,974,420 A * 10/1999 Lehman et al. ...................... 1/1
6,088,679 A *  7/2000 Barkley ........................ 705/7.26
6,141,720 A * 10/2000 Jeffords et al. ............... 710/200
6,202,066 B1 *  3/2001 Barkley et al. ................ 707/785
6,510,478 B1 *  1/2003 Jeffords et al. ............... 710/200
6,529,909 B1 *  3/2003 Bowman-Amuah .................. 1/1
6,751,619 B1 *  6/2004 Rowstron et al. ...................... 1/1
6,988,139 B1 *  1/2006 Jervis et al. ................... 709/226
7,185,192 B1 *  2/2007 Kahn ............................ 713/155
7,197,502 B2 *  3/2007 Feinsmith ............................ 1/1
7,289,964 B1 * 10/2007 Bowman-Amuah ........... 705/1.1
7,340,513 B2 *  3/2008 Donatelli et al. ............. 709/221
7,373,310 B1 *  5/2008 Homsi ......................... 705/7.12

(Continued)

OTHER PUBLICATIONS

Lind K and Norman E (2003). WebSphere Application Server Enterprise Process Choreographer: Staff Resolution Architecture. IBM WebSphere Developer Technical Journal. Apr. 16, 2003. 1-12.*

(Continued)

*Primary Examiner* — Brett Feeney
(74) *Attorney, Agent, or Firm* — Yee & Associates, P.C.; Parashos T. Kalaitzis

(57) ABSTRACT

A computer implemented method, data processing system, and computer program product for dynamically binding business process activities to human entities at deployment time. Identification information about a staff activity in a business process is received from a process server at an access control system external to the process server. Responsive to initiation of the business process, the staff activity is resolved at the access control system at runtime by assigning the staff activity to a user based on an access policy of the access control system to form a staff activity assignment. The staff activity assignment is communicated from the access control system to the process server. The process allows the development of the business process to be entirely decoupled from staff activity resolution at runtime.

12 Claims, 3 Drawing Sheets

(56) References Cited

U.S. PATENT DOCUMENTS

| | | | |
|---|---|---|---|
| 7,469,409 B2* | 12/2008 | Donatelli et al. ............ | 719/316 |
| 7,523,486 B1* | 4/2009 | Turner ............... | 726/2 |
| 7,610,575 B2* | 10/2009 | Sproule ........... | 717/103 |
| 7,676,831 B2* | 3/2010 | Britton et al. ...... | 726/5 |
| 7,779,091 B2* | 8/2010 | Wilkinson et al. .......... | 709/220 |
| 7,793,333 B2* | 9/2010 | Goh et al. ........... | 726/1 |
| 7,823,189 B2* | 10/2010 | Patrick ............ | 726/2 |
| 7,970,729 B2* | 6/2011 | Cozzi ............ | 707/601 |
| 8,024,275 B2* | 9/2011 | Stone ............ | 705/301 |
| 2001/0001864 A1* | 5/2001 | Page et al. ..... | 709/205 |
| 2001/0047485 A1* | 11/2001 | Brown et al. ........ | 713/201 |
| 2002/0147801 A1* | 10/2002 | Gullotta et al. ........ | 709/223 |
| 2002/0178119 A1* | 11/2002 | Griffin et al. ..... | 705/54 |
| 2003/0018519 A1* | 1/2003 | Balz et al. ..... | 705/11 |
| 2003/0046576 A1* | 3/2003 | High et al. ..... | 713/200 |
| 2003/0084168 A1 | 5/2003 | Erickson et al. | |
| 2003/0112666 A1* | 6/2003 | Hageman et al. ........ | 365/200 |
| 2004/0128186 A1* | 7/2004 | Breslin et al. ..... | 705/10 |
| 2004/0205342 A1 | 10/2004 | Roegner | |
| 2005/0028006 A1 | 2/2005 | Leser et al. | |
| 2005/0044227 A1 | 2/2005 | Haugh et al. | |
| 2005/0132048 A1* | 6/2005 | Kogan et al. ..... | 709/225 |
| 2005/0138031 A1* | 6/2005 | Wefers ............ | 707/9 |
| 2005/0149375 A1* | 7/2005 | Wefers ............ | 705/9 |
| 2005/0165809 A1 | 7/2005 | Leymann et al. | |
| 2005/0182773 A1* | 8/2005 | Feinsmith ........ | 707/100 |
| 2005/0203757 A1 | 9/2005 | Lei et al. | |
| 2005/0267765 A1* | 12/2005 | Jeng et al. ......... | 705/1 |
| 2006/0004783 A1* | 1/2006 | Carr et al. ........ | 707/100 |
| 2006/0005124 A1* | 1/2006 | Speicher ........ | 715/514 |
| 2006/0009991 A1 | 1/2006 | Jeng et al. | |
| 2006/0036869 A1* | 2/2006 | Faught ......... | 713/182 |
| 2006/0047558 A1* | 3/2006 | Uchiyama et al. ........ | 705/9 |
| 2006/0089938 A1* | 4/2006 | Leonard et al. ........ | 707/100 |
| 2006/0101019 A1 | 5/2006 | Nelson et al. | |
| 2006/0106825 A1* | 5/2006 | Cozzi ......... | 707/100 |
| 2006/0111931 A1 | 5/2006 | Johnson et al. | |
| 2006/0247965 A1* | 11/2006 | Griffith et al. ..... | 705/9 |
| 2006/0268712 A1* | 11/2006 | Deen et al. ........ | 370/235 |
| 2007/0033571 A1* | 2/2007 | Moore et al. ........ | 717/104 |
| 2007/0150496 A1* | 6/2007 | Feinsmith ........ | 707/100 |
| 2007/0211056 A1* | 9/2007 | Chakraborty et al. ....... | 345/440 |
| 2007/0239859 A1* | 10/2007 | Wilkinson et al. ........ | 709/220 |
| 2007/0239998 A1* | 10/2007 | Beck ............ | 713/193 |
| 2007/0271381 A1* | 11/2007 | Wholey et al. ........ | 709/226 |
| 2007/0283351 A1* | 12/2007 | Degenaro et al. ........ | 718/100 |
| 2007/0299795 A1* | 12/2007 | Macbeth et al. ........ | 706/16 |
| 2007/0300224 A1* | 12/2007 | Aggarwal et al. ........ | 718/100 |
| 2008/0022370 A1* | 1/2008 | Beedubail et al. ........ | 726/4 |
| 2008/0034071 A1* | 2/2008 | Wilkinson et al. ........ | 709/220 |
| 2008/0222147 A1* | 9/2008 | El Homsi ........ | 707/6 |
| 2008/0222602 A1* | 9/2008 | Vaziri-Farahani et al. ... | 717/116 |
| 2008/0256610 A1* | 10/2008 | Patrick ........... | 726/4 |
| 2008/0294599 A1* | 11/2008 | Lei et al. ........ | 707/3 |
| 2009/0213860 A1* | 8/2009 | Liu et al. ........ | 370/395.53 |

OTHER PUBLICATIONS

Keys Botzum, Bill Hines, Paul Ilechko, Messaoud Benantar, Peter Birk (2005). Advanced authentication in WebSphere Application Server Managing user authenticity and privileges in a distributed application server environment. IBM WebSphere Developer Technical Journal. 1.*

Haibin Zhu, MengChu Zhou and Pierre Seguin (2006). Supporting Software Development With Roles. IEEE Transactions on Systems, Man, and Cybernetics—Part A: Systems and Humans, vol. 36, No. 6, Nov. 2006. 1110-1123.*

Haibo Yu, Qi Xie and Haiyan Che (2006). Description Logic Based Conflict Detection Methods for RB-RBAC Model. IJCSNS International Journal of Computer Science and Network Security, vol. 6 No. 1A, Jan. 2006. 120-125.*

Juan M. Murillo, Juan Hernández, Fernando Sánchez, Luis A. Álvarez (1999). Coordinated Roles: Promoting Re-usability of Coordinated Active Objects Using Event Notification Protocols. Lecture Notes in Computer Science, 1999, vol. 1594/1999, 647: 53-68.*

Lind K (2003). WebSphere Application Server Enterprise Process Choreographer. Staff Resolution Parameter Reference. Mar. 28, 2003. 1-51.*

Yuqing Sun, Xiangxu Meng, Shijun Liu, and Peng Pan (2006). Flexible Workflow Incorporated with RBAC. CSCWD 2005, LNCS 3865, pp. 525-534.*

Alex Louwe Kooijmans Marc van der Meer Tony Nix (2006). WebSphere Application Server on z/OS and Security Integration. Jun. 2006. IBM Redbooks. 1-120.*

Lind K (2007). Authorization and staff resolution in Business Process Choreographer: Part 1: Understanding the concepts and components of staff resolution. IBM WebSphere Developer Technical Journal. Sep. 26, 2007. 1-14.*

Tanvir Ahmed and Anand R. Tripathi (2003). Static Verification of Security Requirements in Role Based CSCW Systems. SACMAT'03, Jun. 1-4, 2003, ACM: 1-8.*

Salem Benferhat, Rania El Baida, Frederic Cuppens (2003). A Possibilistic Logic Encoding of Access Control. American Association for Artificial Intelligence. 1-5.*

Axel Buecker and Mike Campbell (2005). IBM Tivoli Access Manager for e-business. Redbooks Paper. 1-32.*

Jeong et al., "A Flexible Database Security System Using Multiple Access Control Policies", IEEE 2003, pp. 236-240.

Benferhat et al., "A prioritized-based approach to handling conflicts in access control", Proceedings of the 16th IEEE International Conference on Tools with Artificial Intelligence (ICTAI 2004), pp. 1-8.

* cited by examiner

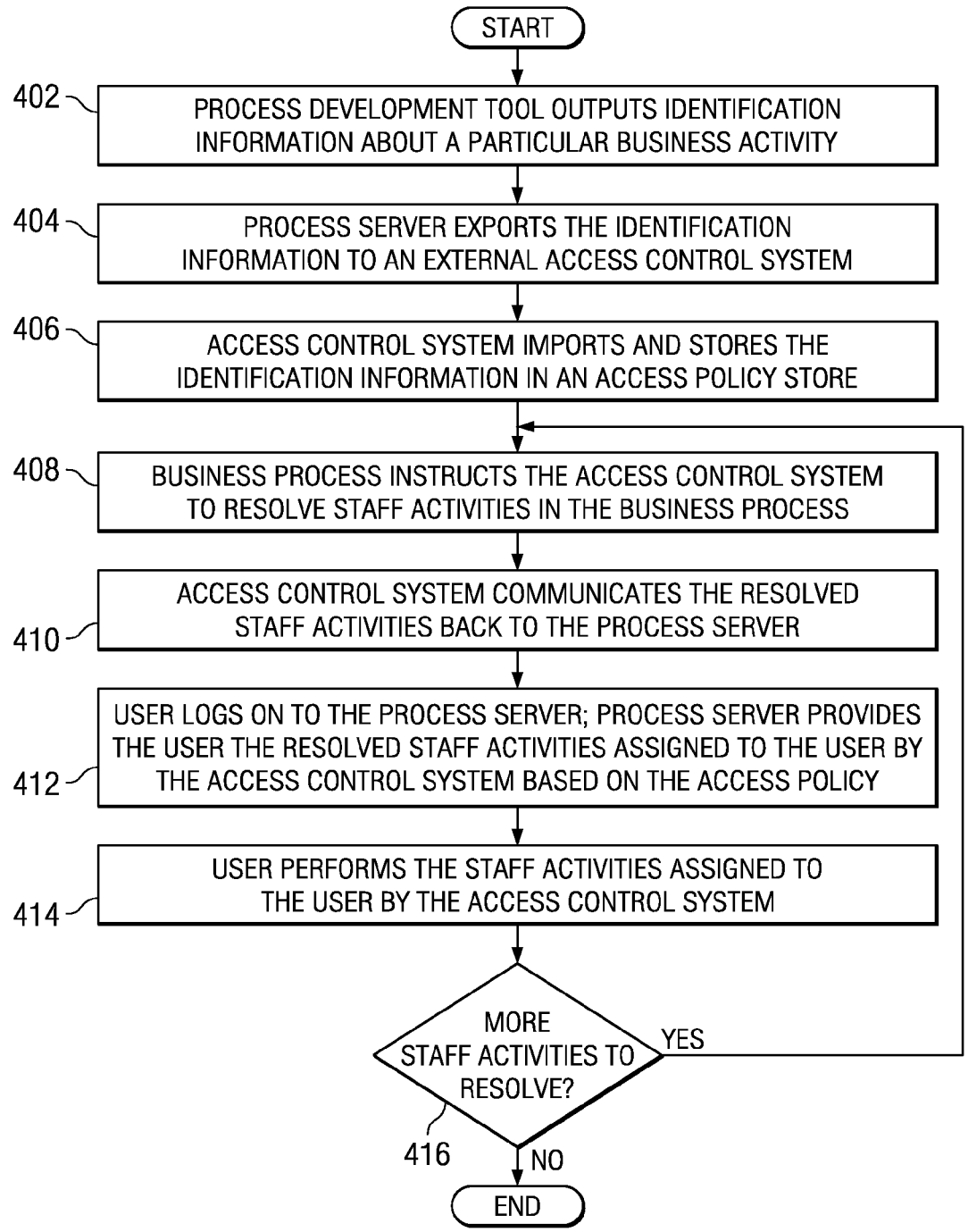

POLICY-BASED ACCESS CONTROL APPROACH TO STAFF ACTIVITIES OF A BUSINESS PROCESS

BACKGROUND OF THE INVENTION

1. Field of the Invention

The present invention relates generally to an improved data processing system, and in particular, to dynamically binding business process activities to human entities at deployment time.

2. Description of the Related Art

Business processes define a set of coordinated tasks and activities that lead to accomplishing specific goals of an organization. Business processes may be implemented in a proprietary software language or may be implemented using an industry standard language, such as the Business Process Execution Language (BPEL). A business process may include activities which comprise automated tasks, which are performed by computers or other machines, as well as manual activities, which require some form of human intervention. One example of an activity requiring human intervention is a process in which a request for a change is received, and a human entity must assess the impact and give approval of the requested change prior to the change being implemented. Activities requiring human intervention are often called "staff activities".

Most organizations classify their personnel into different roles based on the activities performed by each user. For example, a service provider may assign different individuals to manage different customers, different regions, and different groups of devices. In addition, users with different skill sets may assume different duties within the organization. Policy rules may be used to restrict the actions of any particular user to those operations that are appropriate for the user's role. For instance, in a typical network management system of possibly thousands of devices, the system may contain a security policy for the network administrator, for example, by assigning a specific class of privileges to the administrator based on the administrator's group. Within a runtime environment, the administrator can attempt to perform certain administrative functions that are not allowed to be performed by the average user. For example, a particular administrator may be responsible for maintaining a particular subnet of devices with a range of IP addresses between X.Y.Z.0 and X.Y.Z.255. At some point, the administrator may log into the management system and attempt to manage a device at address X.Y.Z.5. The network management system uses the security policy to determine whether to allow the administrator to perform the management function on that particular device. The process of deciding which users are allowed to perform specific activities in a business process is called "staff resolution".

Current technologies include specialized components which allow for staff resolution of business activities to the respective human entities in the organization's personnel. An example of a product capable of staff resolution is Websphere® Application Server Enterprise Process Choreographer, also called Websphere Process Server, which is a product of International Business Machines Corporation. The staff service component in the Process Choreographer and in other current technologies is provided by and supported by the process engine of an application server. In addition, the definitions (i.e., information used for binding a particular role to an activity to be performed) that enable staff resolution using the current technologies are created at process development time. Since the human entities responsible for performing business activities are defined at development time, these definitions represent a very static aspect of such business processes. Any changes to the definitions will require rebuilding and redeploying the business process. The rebuilding of business processes are generally not feasible in a customer environment where only the binaries of these processes are available to the customer. Additionally, the customer may not want to invest in the skills which are necessary to implement these changes. Although there are sophisticated scenarios in which some flexibility is built into a business process by way of parameterizing role to business activity, the binding of business activities to roles and human entities still remains static in nature, in that no additional entities or roles in an organization may be further added to the business process without having to rebuild the process.

SUMMARY OF THE INVENTION

The illustrative embodiments provide a computer implemented method, data processing system, and computer program product for dynamically binding business process activities to human entities at deployment time. Identification information about a staff activity in a business process is received from a process server at an access control system external to the process server. Responsive to initiation of the business process, the staff activity is resolved at the access control system at runtime by assigning the staff activity to a user based on an access policy of the access control system to form a staff activity assignment. The staff activity assignment is communicated from the access control system to the process server. The process in the illustrative embodiments allows the development of the business process to be entirely decoupled from staff activity resolution at runtime.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process for dynamically binding business process activities to human entities in accordance with the illustrative embodiments.

DETAILED DESCRIPTION OF THE PREFERRED EMBODIMENT

Figure 1:
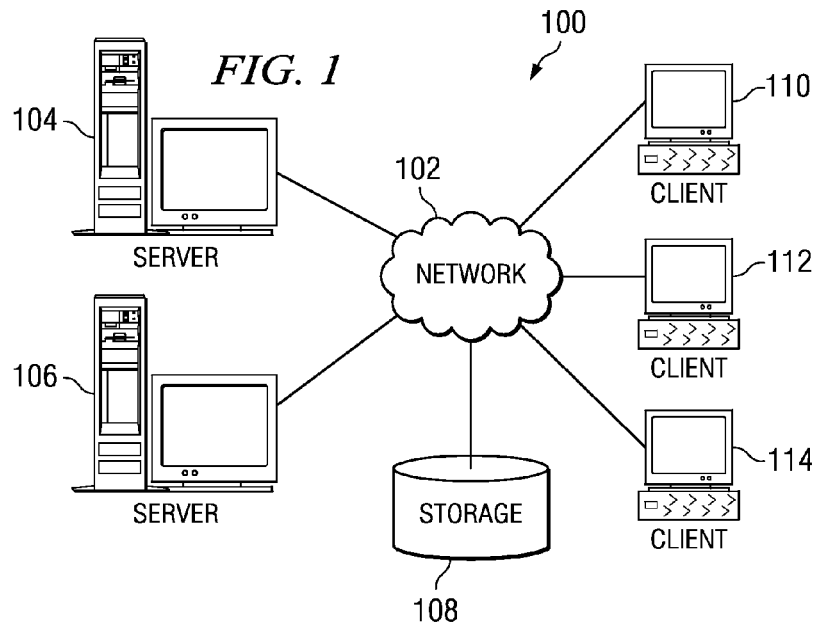
FIG. 1 depicts a pictorial representation of a distributed data processing system in which the illustrative embodiments may be implemented.
Figure 2:
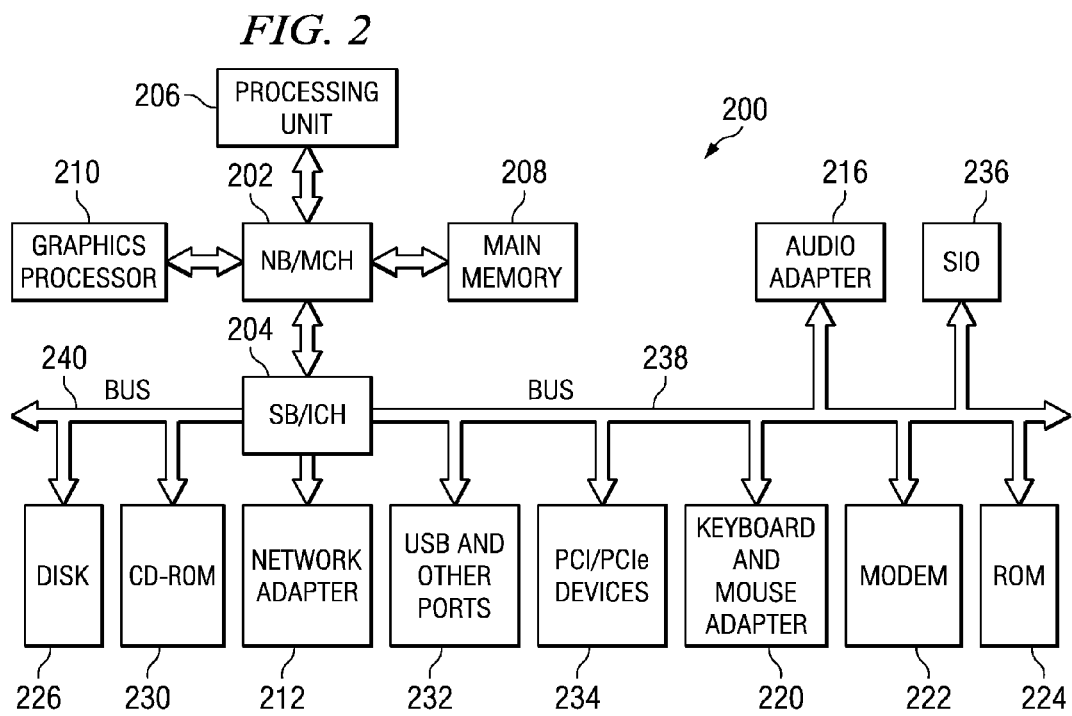
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all JavaT™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

As previously mentioned, certain computer processes are often termed "business processes", as these business processes are computer processes which are often customized to a particular company's needs and typically involve some amount of human interaction. Since most organizations classify their personnel into different organizational roles based on the tasks performed by each individual, the actions of any particular individual may be restricted to those operations that are appropriate for the individual's role in the organization based on policy rules. The process of binding a task to an individual or organizational role ("staff resolution") comprises deciding which user in the organization is allowed to perform the activity in a business process.

The illustrative embodiments provide a dynamic method and system for binding a business process activity to a corresponding human entity or organizational role. In contrast with existing staff resolution techniques, such as those offered by Websphere Process Choreographer, which are provided by and supported by the process engine of the application server, the illustrative embodiments decouple the policy-based authorization from the process engine and externalize this authorization in a policy-based access control system. In addition, with the illustrative embodiments, binding is implemented at deployment time through the policy-based access control system. By externalizing the assignment of business process activities to organizational roles or human entities to the access control system, the dynamic process in the illustrative embodiments does not need to rely on definitions created at development time to implement the binding process, and thus the process avoids the static nature of existing staff resolution techniques. In addition, implementing the binding process at deployment time in the access control system shields a user from having to re-build and re-deploy a business process when a change occurs in the underlying definitions which enable staff resolution.

The dynamic staff resolution process described in the illustrative embodiments provides several advantages over existing staff resolution techniques. For instance, with the illustrative embodiments, the binding of human entities to staff activities of a process is completely dynamic and is process-independent. Existing staff resolution techniques implement this binding as part of the process logic. Thus, a business process developer using the illustrative embodiments may focus solely on the business process logic at development time, rather than having to be concerned over binding of staff activities to human entities. In addition, human intervention during business process activities may be subject to various rules. For instance, a particular approval process may require the approval of an entire set of persons exercising a particular role or a subset thereof. Similarly, another policy may render the tasks to an automatic approval based on the satisfaction of pre-set conditions. Since the binding in the illustrative embodiments is delegated to an access control system, roles, users and deciding rules may be updated at deployment time to accommodate the needs of the organization. Furthermore, with the illustrative embodiments, the staff service component in products such as Websphere Process Choreographer becomes a very light-weight component of the process engine, as the staff service component simply acts as an interface to the underlying access control system.

Figure 3:
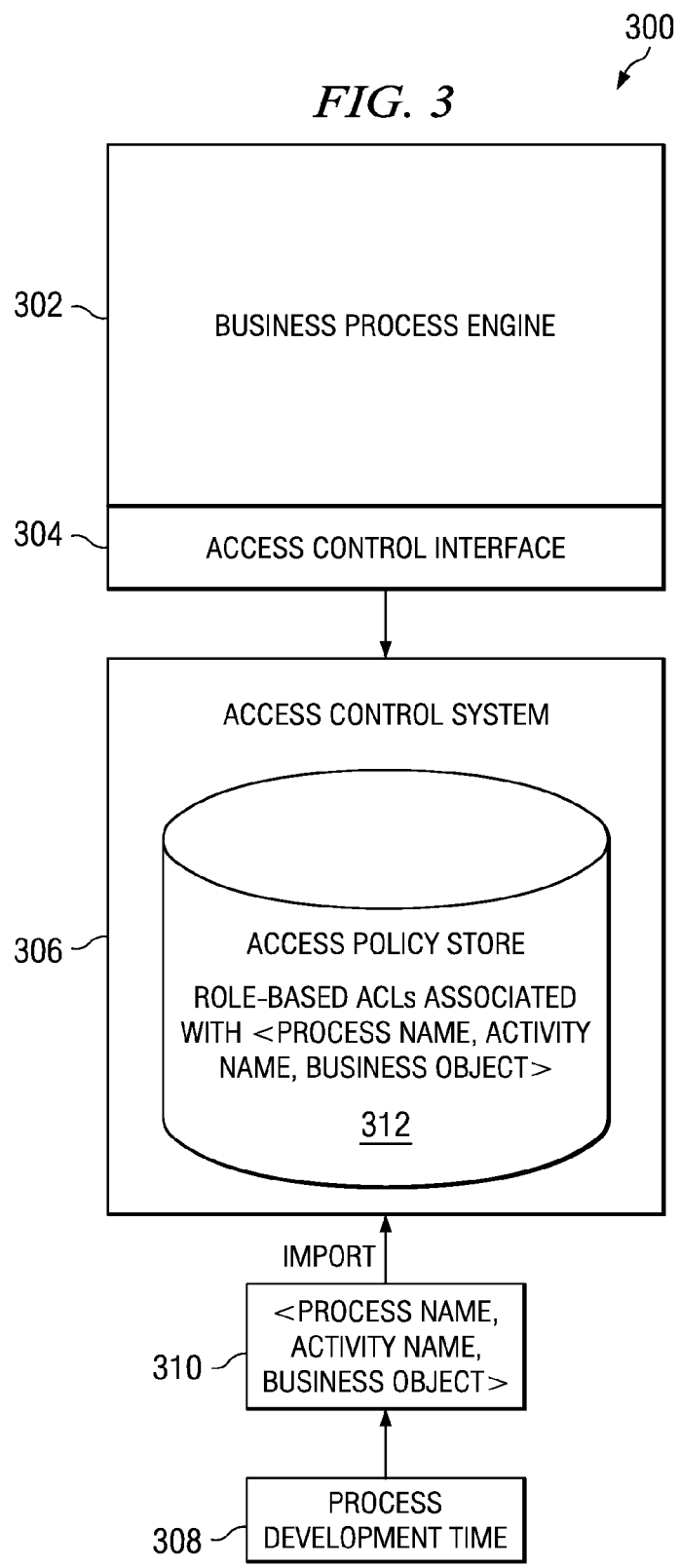
FIG. 3 is a block diagram of exemplary components for implementing the policy-based access control of business process activities in accordance with the illustrative embodiments.

FIG. 3 is a block diagram of exemplary components for implementing the policy-based access control of business process activities in accordance with the illustrative embodiments. In particular, FIG. 3 illustrates how the binding of human entities to business process activities is implemented within an access control system.

Data processing system 300 in this illustrative example comprises business process engine 302, access control interface 304, and access control system 306. Business process engine 302 is a process server, which may be implemented as server 104 or 106 in FIG. 1. Business process engine 302 contains the runtime components necessary to execute a business process, and interprets the business processes defined by a business process developer in order to execute and manage business transactions. Business process engine 302 oversees the business transactions in the data processing system by reminding an individual or group participant of their assigned staff activities, such as via a calendar or email program. Business process engine 302 also may act as a client device to access control system 306.

Access control interface 304 allows business process engine 302 to interface with external systems. In this illustrative example, a Java™ Authorization Contract for Container (JACC) interface is used as the access control interface 304, although other appropriate interfaces may also be used. JACC provides the ability to delegate access decisions to an external provider, such as access control system 306. Business process engine 302 is interfaced via JACC to access control system 306.

Access control system 306 is an authorization provider external to business process engine 302 which receives information about a user security context and determines whether any activities are assigned to the user. Access control system 306 may be located on any server 104 or 106 in FIG. 1. Access control system 306 protects resources (business process activities) in the system by making them available to users who are identified as assigned to those resources. Access control system 306 may include a user registry, such as a corporate LDAP server or a database, comprising user and group/role information. Resources may be defined and mapped to particular users and roles within the organization to constrain resource access based on these mappings. This mapping may be to one or more individual users by name, to one or more defined groups of users, or any combination of these. These mappings may be stored as role-based access control lists (ACLs) within access control system 306. An example of an access control system is Tivoli® Access Manager, a product of International Business Machines Corporation.

The binding of staff activities and human entities or organizational roles in the illustrative embodiments occurs in a dynamic, rather than static, fashion. At process development time 308, a process development tool outputs only identification information of the staff activities 310 contained in a business process. For example, identification information of each staff activity 310 may be output in a tuple, such as:

<Process Name—Identifier, Activity Name—Identifier, Business Object>.

The process name identification and activity name identification may be obtained from business process engine 302. The business object refers to the resource(s) that will be affected by the actions of the staff activity. Examples of resources which may be affected include, among others, both physical resources such as computer systems, machines, and equipment, and logical entities such as customer records, accounts, and orders.

Business process engine 302 then exports the identification information of a staff activity 310 in tuple form, and imported to an authorization policy engine in access control system 306. The authorization policy engine in access control system 306 comprises policy information required to determine the binding of each staff activity to a corresponding human entity or an organizational role, or to a rule based policy statement when access control system 306 supports such rules.

Access control system 306 then stores the tuple in access policy store 312. It should be noted that storing staff activity information within access control system 306 is a departure from existing staff resolution mechanisms which persist this staff activity information in their own control structures, rather than in a control system external to access control system 306. Access policy store 312 also comprises role-based access control lists (ACLs), which access control system 306 uses to form the bindings between the staff activities and the human entities or organizational roles based on the information in the tuple.

When a particular business process is instantiated, the business process runs until the process reaches a point in its workflow where a human intervention is required (i.e., reached a staff activity). When a user authenticates (logs on)

to the system and checks if the user has a pending staff activity, the resolution of that staff activity to a human entity is performed by access control system 306, communicated back to business process engine 302, and provided to the requesting user. For instance, upon a user login, business process engine 302 may invoke access control system 306 by passing the user security context (e.g. an authenticated identity and its group/role information) to access control system 306. Access control system 306 queries the access control lists (ACLs) in access policy store 312 against the user information and returns <Process Name, Activity Name> of each activity that is awaiting the user's intervention. Business process engine 302 provides this user information to access control system 306 and allows access control system 306 to make an access decision (i.e., a determination whether the user has any pending staff activities assigned). Access control system 306 provides the pending staff activity information to business process engine 302, which in turn provides the activity information to the user.

Access control system 306 may also determine whether or not access to a resource may be given to an entity by first determining whether the entity has access to the process activity template. For example, a change requester may instantiate a change management process only if the requester is allowed access to the underlying change management process template. A process template is a generic process definition that has not yet been customized to a particular environment, such as a change management process template in which staff activities have not yet been defined.

FIG. 4 is a flowchart of a process for dynamically binding business process activities to human entities in accordance with the illustrative embodiments. The process described in FIG. 4 may be implemented in a data processing system, such as data processing system 300 in FIG. 3. The process begins at development time, where a process development tool used to define a process outputs information about all of the tool's staff activities (step 402). This information may comprise identification information about the staff activities in tuple form, which includes an identifier of a business process, an identifier of a particular staff activity in the process, and the business objects which will be affected by the actions of the staff activity.

The process server then exports the identification information containing information about the staff activity in tuple form to an authorization policy engine in an external access control system (step 404). The access control system comprises policy information required to determine the binding of each business activity to a corresponding human entity or an organizational role. The external access control system then imports and stores the identification information in an access policy store within the access control system (step 406).

When a business process is initiated, the business process instructs the external access control system to resolve the staff activities in the business process which have no dependency on other staff activities (step 408). In this instance, resolution means assigning staff activities to the entitled human entities based on the access policy of the access control system. The resolved staff activities are communicated back from the access control system to the process server (step 410).

When a user authenticates (logs on) to the process server and checks if the user has a pending staff activity, the process server provides the user with those staff activities which were assigned to the user by the access control system based on the access policy (step 412). For example, the process server may provide the business process name and the business activity name to the user which are pending the user's intervention.

The user may then perform the business activities dynamically assigned to the user by the access control system (step 414).

A determination is then made as to whether there are any other staff activities in the business process which should be resolved (step 416). If there are more staff activities to be resolved ('yes' output of step 416), the process loops back to step 408. If there are no more staff activities to be resolved ('no' output of step 416), the process terminates thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamically assigning a staff activity to a human entity or organizational role, the computer implemented method comprising:

receiving, from a process server, identification information defined by an output from a process development tool at development time, about a particular staff activity in a business process at an access control system external to the process server, wherein the identification information is a tuple comprising an identifier of the business process, an identifier of the particular staff activity in the business process, and business objects affected by actions of the particular staff activity and wherein the identification information is absent identification of an identified user;

storing the tuple in an access policy store of the access control system, wherein the access policy store comprises role-based access control lists to form bindings between the staff activities and human entities or organizational roles using the identification information in the tuple and wherein the human entities, the organizational roles and deciding rules are able to be updated at deployment time;

responsive to initiation of the business process, running the business process until the business process reaches a point in a workflow for the particular staff activity and dynamically resolving the particular staff activity at the access control system at runtime by assigning the particular staff activity to the identified user by an authorization policy engine in the access control system using an access policy of the access control system and the tuple stored to form a staff activity assignment, wherein resolving the particular staff activity at the access control system further includes:

examining membership of the identified user in an organizational group or role;

assigning the particular staff activity to the identified user based on a membership of the identified user; and communicating the staff activity assignment from the access control system to the process server, wherein the staff activity assignment includes a process name, activity name pair of each activity awaiting intervention by the identified user;

wherein the receiving, resolving, and communicating steps enable development of the business process to be decoupled from staff activity resolution at runtime.

2. The computer implemented method of claim 1, wherein the process server provides the staff activity assignment to the identified user.

3. The computer implemented method of claim 1, wherein the staff activity assignment is provided to the identified user in response to the identified user logging onto the process server.

4. The computer implemented method of claim 1, wherein the identified user is one of a human entity, organizational group, or organizational role.

5. The computer implemented method of claim 1, wherein an authorization policy engine in the access control system receives the identification information from the process server.

6. A data processing system for dynamically assigning a staff activity to a human entity or organizational role, the data processing system comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to receive, from a process server, identification information defined by an output from a process development tool, at development time, about a particular staff activity in a business process at an access control system external to the process server, wherein the identification information is a tuple comprising an identifier of the business process, an identifier of the particular staff activity in the business process, and business objects affected by actions of the particular staff activity and wherein the identification information is absent identification of an identified user;
   store the tuple in an access policy store of the access control system, wherein the access policy store comprises role-based access control lists to form bindings between the staff activities and human entities or organizational roles using the identification information in the tuple and wherein the human entities, the organizational roles and deciding rules are able to be updated at deployment time;
   dynamically resolve the particular staff activity at the access control system at runtime by running the business process until the business process reaches a point in a workflow for the particular staff activity and assigning the particular staff activity to the identified user by an authorization policy engine in the access control system using an access policy of the access control system and the tuple stored to form a staff activity assignment in response to initiation of the business process, wherein resolving the particular staff activity at the access control system further includes:
      examining membership of the identified user in an organizational group or role and assigning the particular staff activity to the user based on a membership of the identified user, and communicate the staff activity assignment from the access control system to the process server, wherein the staff activity assignment includes a process name, activity name pair of each activity awaiting intervention by the identified user, wherein the computer usable code to receive, resolve, and communicate enable development of the business process to be decoupled from staff activity resolution at runtime.

7. The data processing system of claim 6, wherein the processing unit further executes the computer usable code to provide the staff activity assignment to the identified user.

8. A computer program product for dynamically assigning a staff activity to a human entity or organizational role, the computer program product comprising:
   a non-transitory computer usable medium having computer usable program code stored thereon, which when executed by a computer directs the computer to:
   receive, from a process server, identification information, defined by an output from a process development tool at development time, about a particular staff activity in a business process at an access control system external to the process server, wherein the identification information is a tuple comprising an identifier of the business process, an identifier of the particular staff activity in the business process, and business objects affected by actions of the particular staff activity and wherein the identification information is absent identification of a user;
   store the tuple in an access policy store of the access control system, wherein the access policy store comprises role-based access control lists to form bindings between the staff activities and human entities or organizational roles using the identification information in the tuple and wherein the human entities, the organizational roles and deciding rules are able to be updated at deployment time;

dynamically resolve the particular staff activity at the access control system at runtime by running the business process until the business process reaches a point in a workflow for the particular staff activity and assigning the particular staff activity to the identified user by an authorization policy engine in the access control system using an access policy of the access control system and the tuple stored to form a staff activity assignment in response to initiation of the business process, wherein executing computer usable program code for resolving the particular staff activity at the access control system further directs the computer to:

examine membership of the identified user in an organizational group or role and computer usable program code for assigning the particular staff activity to the identified user based on a membership of the identified user; and communicate the staff activity assignment from the access control system to the process server, wherein the staff activity assignment includes a process name, activity name pair of each activity awaiting intervention by the identified user;

wherein the directing the computer to receive, resolve, and communicate enable development of the business process to be decoupled from staff activity resolution at runtime.

9. The computer program product of claim 8, further comprising:

computer usable program code for providing the staff activity assignment to the identified user.

10. The computer program product of claim 8, wherein the staff activity assignment is provided to the identified user in response to the identified user logging onto the process server.

11. The computer program product of claim 8, wherein the identified user is one of a human entity, organizational group, or organizational role.

12. The computer program product of claim 8, wherein an authorization policy engine in the access control system receives the identification information from the process server.

* * * * *